(12) United States Patent
Fujiwara et al.

(10) Patent No.: US 7,604,901 B2
(45) Date of Patent: Oct. 20, 2009

(54) NONAQUEOUS ELECTROLYTE SECONDARY BATTERY

(75) Inventors: Kazuyasu Fujiwara, Tokushima (JP); Masatoshi Takahashi, Tokushima (JP); Masato Iwanaga, Tokushima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 669 days.

(21) Appl. No.: 10/509,756

(22) PCT Filed: Jun. 23, 2003

(86) PCT No.: PCT/JP03/07944

§ 371 (c)(1), (2), (4) Date: Sep. 30, 2004

(87) PCT Pub. No.: WO04/001889

PCT Pub. Date: Dec. 31, 2003

(65) Prior Publication Data

US 2006/0166102 A1    Jul. 27, 2006

(30) Foreign Application Priority Data

Jun. 21, 2002    (JP) .......................... 2002-182128

(51) Int. Cl.
H01M 1/40    (2006.01)
(52) U.S. Cl. ........................ 429/326; 429/324
(58) Field of Classification Search ................ 429/307, 429/312, 324, 330, 338, 326, 340, 329, 336
See application file for complete search history.

(56) References Cited

U.S. PATENT DOCUMENTS 5,879,834 A    3/1999    Mao

| 6,632,572 B1 * | 10/2003 | Takahashi et al. ........... 429/326 |
| 2004/0028996 A1 | 2/2004 | Hamamoto et al. |
| 2005/0118512 A1 * | 6/2005 | Onuki et al. ................. 429/326 |

FOREIGN PATENT DOCUMENTS

| EP | 1 215 745 | 6/2002 |
| JP | 05-036439 | 2/1993 |
| JP | 9-106835 A | 4/1997 |
| JP | 10-074537 | 3/1998 |
| JP | 10-275632 | 10/1998 |
| JP | 2001-015155 | 1/2001 |

(Continued)

OTHER PUBLICATIONS

Office Action dated Mar. 31, 2006, issued in corresponding Chinese Application No. 03814595.2.

*Primary Examiner*—Patrick Ryan
*Assistant Examiner*—Monique Wills
(74) *Attorney, Agent, or Firm*—Westerman, Hattori, Daniels & Adrian, LLP.

(57) ABSTRACT

A non-aqueous electrolyte secondary cell that has excellent high-temperature cycle characteristics and that is highly safe enough to prevent overcharge is provided. The non-aqueous electrolyte secondary cell has a positive electrode for reversibly intercalating-deintercalating lithium ions, a negative electrode for reversibly intercalating-deintercalating lithium ions, and a non-aqueous electrolyte having a non-aqueous solvent and an electrolyte salt. The non-aqueous solvent includes a cycloalkylbenzene derivative and an alkylbenzene derivative having a quaternary carbon directly bonded to a benzene ring and not having a cycloalkyl group directly bonded to the benzene ring.

4 Claims, 2 Drawing Sheets

FOREIGN PATENT DOCUMENTS

| | | | |
|---|---|---|---|
| JP | 2001-15158 A | | 1/2001 |
| JP | 2002-050398 | * | 2/2002 |
| JP | 2002-56892 A | | 2/2002 |
| JP | 2002-117895 | | 4/2002 |
| JP | 2002-260725 | | 9/2002 |
| JP | 2002-298909 | * | 11/2002 |
| JP | 2002-110229 | * | 12/2002 |
| JP | 2003-051338 | | 2/2003 |
| JP | 2003-308875 | * | 10/2003 |
| WO | WO 02/29922 A1 | | 4/2002 |

* cited by examiner

NONAQUEOUS ELECTROLYTE SECONDARY BATTERY

TECHNICAL FIELD

The present invention relates to an improvement of non-aqueous electrolyte secondary cells having a positive electrode for reversibly intercalating-deintercalating lithium ions, a negative electrode for reversibly intercalating-deintercalating lithium ions, and a non-aqueous electrolyte.

BACKGROUND ART

In recent years, there has been a rapid reduction in the size and weight of mobile information terminals such as mobile telephones, notebook personal computers, and PDA. Higher capacity is required of cells and batteries serving as the driving power sources of such terminals. Non-aqueous electrolyte secondary cells represented by lithium ion secondary cells have high energy density and high capacity and as such are widely used as the driving power sources of the mobile information terminals.

Generally, non-aqueous electrolyte secondary cells use a positive electrode made of a lithium-containing transition metal compound oxide, a negative electrode made of carbon material such as graphite, and a non-aqueous electrolyte containing a lithium salt dissolved in a non-aqueous solvent. In such cells, there is migration of lithium ions between the positive electrode and the negative electrode during charge and discharge, and internal short circuiting caused by dendrite lithium does not occur because no lithium exists in the state of metal. Such cells therefore excel in safety.

However, such non-aqueous electrolyte secondary cells can be problematic in that overcharge causes an excessive release of lithium ions from the positive electrode and an excessive storage of the lithium ions in the negative electrode. This lowers the thermal stability of both electrodes, deteriorating cell characteristics. Also, an extremely unbalanced differential between the electrodes decomposes the electrolytic solution. The decomposition of the electrolyte causes, as well as gas generation, heat generation resulting from an increase in internal cell resistance. As a result, there can be a rapid increase in internal cell pressure, causing cell burst and thermal runaway.

In view of these problems, the non-aqueous electrolyte secondary cells have incorporated therein a current-cutting device for cutting an overcharged current, upon generation of such a current. However, the current-cutting device operates to cut the current only upon increase in internal cell pressure, and there is a time-lag between abnormality to occur in the cell and the increase of internal cell pressure. Thus, it takes a long time before the current-cutting device operates, and there is a doubt as to ensuring security in the case of an intense temperature increase.

Also in view of the problems, there have been proposed techniques of adding various additives in the non-aqueous electrolyte. For instance, Japanese Unexamined Patent Publication No. H5-36439 discloses a technique of adding a linear alkylbenzene derivative in a non-aqueous solvent in a non-aqueous electrolyte secondary cell having a current-cutting device. With this technique, at the time of overcharge, the linear alkylbenzene derivative is dissolved to generate methanes that in turn consume an active oxygen detached from the positive electrode by reacting with the oxygen. Thus, this technique is aimed at preventing a temperature increase caused by the active oxygen. However, since the linear alkylbenzene derivative operates neither to cut an overcharged current nor to increase the response rate of the current-cutting device, the technique cannot ensure security in the case of an intense temperature increase.

Japanese Unexamined Patent Publication No. H9-106835 discloses a technique of preventing overcharge by using a non-aqueous solvent having added therein thiophene, biphenyl, furan, and the like. With this technique, the compounds thiophene, biphenyl, and furan polymerize at a potential higher than or equal to the highest cell operation voltage and form a highly resistive film on the electrode surfaces, thus trying to prevent overcharge. However, this technique is problematic in that the above compounds cause to lower power generation performance, and that since the compounds polymerize only under a high temperature of 120° C. or higher the current cutting-off cannot be realized with the use of the compounds unless the cell temperature becomes high.

On the other hand, the present inventors suggested in Japanese Unexamined Patent Publication No. 2001-15155 a technique of preventing overcharge by adding in a non-aqueous solvent a cycloalkylbenzene derivative or an alkylbenzene derivative having a tertiary carbon adjoining a phenyl group. These additives, suggested by the present inventors, are chemically decomposed at the time of overcharge and generate a hydrogen gas, and the molecules polymerize together to form a film on the negative electrode surface. This film is stable and insoluble in the non-aqueous solvent and has high electrical resistance. With this technique, the hydrogen gas generated from the electrode and the highly resistive film operate to rapidly increase internal resistance and prevent overcharge, thereby ensuring security in the case of an intense temperature increase.

When the non-aqueous solvent having added therein the above additives is used in a non-aqueous electrolyte secondary cell provided with the current-cutting device, the following advantageous effect is obtained in addition to the above effect. The hydrogen gas generated from the electrode increases internal cell pressure, thereby increasing the response rate of the current-cutting device. It should be noted, however, that these compounds are decomposed to form a highly resistive film on the active material surface of the negative electrode if the cell is used under a high temperature environment of 40° C. to 60° C., regardless of the overcharged state. Thus, when using the cell under a high temperature environment, there is the problem of lowering cell performance such as cell cycle characteristics.

DISCLOSURE OF THE INVENTION

In view of the foregoing and other problems, it is an object of the present invention to provide a non-aqueous electrolyte secondary cell that has good cycle characteristics and that is highly safe enough to prevent overcharge. It is another object of the present invention to provide, where the current-cutting device is provided, a highly safe non-aqueous electrolyte secondary cell that increases the responsiveness of the current-cutting device.

These objects of the present invention can be accomplished by the following structures.

(A) A non-aqueous electrolyte secondary cell comprising a positive electrode for reversibly intercalating-deintercalating lithium ions, a negative electrode for reversibly intercalating-deintercalating lithium ions, and a non-aqueous electrolyte having a non-aqueous solvent and an electrolyte salt, wherein the non-aqueous solvent includes a cycloalkylbenzene derivative and an alkylbenzene having a quaternary carbon directly bonded to a benzene ring and not having a cycloalkyl group directly bonded to the benzene ring.

In the cycloalkylbenzene derivative, a hydrogen atom bonded to α carbon (a carbon directly bonded to the benzene ring) in the cycloalkyl group has high reactivity, and as such this hydrogen is easy to be pulled out at the time of overcharge. Thus, at the time of overcharge the cycloalkylbenzene derivative is rapidly decomposed at the negative electrode to generate a hydrogen gas, and the cycloalkylbenzene derivative itself polymerizes to form a stable film on the negative electrode surface. This film has high electrical resistance. With this structure, since the generated hydrogen gas and the highly resistive film rapidly increase internal resistance, overcharge is restricted before an intense temperature increase. In a cell provided with a current-cutting device that is configured to operate upon increase in internal cell pressure, the hydrogen gas generated by the decomposition of the cycloalkylbenzene derivative increases the internal cell pressure, thereby significantly increasing the reactivity of the current-cutting device.

Further, the alkylbenzene derivative having a quaternary carbon directly bonded to the benzene ring and not having a cycloalkyl group directly bonded to the benzene ring (where necessary hereinafter referred to as an alkylbenzene derivative having a quaternary carbon directly bonded to the benzene ring) is adsorbed on the negative electrode surface to form a film so that the cycloalkylbenzene derivative would not come in direct contact with the negative electrode. This restricts the decomposition of the cycloalkylbenzene derivative under a high temperature, thereby preventing the deterioration of high temperature cycle characteristics.

With the above described structure, a non-aqueous electrolyte secondary cell excellent in safety is realized without deteriorating high temperature cycle characteristics.

(2) In the structure of (1) above, the non-aqueous solvent may further include an unsaturated cyclic carbonate derivative.

This structure is more preferable in that the unsaturated cyclic carbonate derivative operates to restrict the decomposition of the cycloalkylbenzene derivative under a high temperature. This is because the alkylbenzene derivative having a quaternary carbon directly bonded to the benzene ring is adsorbed mainly on the basal surface of the carbon and the unsaturated cyclic carbonate is adsorbed on a negative electrode portion (mainly on the edge surface of the carbon) other than the basal surface. That is, the alkylbenzene derivative and the unsaturated cyclic carbonate cooperate in more effectively restricting the decomposition of the cycloalkylbenzene derivative.

It should be noted that an alkylbenzene derivative that has both the cycloalkyl group and the quaternary carbon directly bonded to the benzene ring mainly functions as a cycloalkylbenzene derivative, although the reason therefor is unknown. For this reason, this compound will be treated as a kind of the cycloalkylbenzene derivative.

(3) In the structure of (1) or (2) above, the cycloalkylbenzene derivative may be contained in the non-aqueous solvent at a ratio of 0.5 to 5 parts by mass per 100 parts by mass of the non-aqueous solvent, and the alkylbenzene derivative having a quaternary carbon directly bonded to a benzene ring and not having a cycloalkyl group directly bonded to the benzene ring may be contained in the non-aqueous solvent at a ratio of 0.5 to 10 parts by mass per 100 parts by mass of the non-aqueous solvent.

If the cycloalkylbenzene derivative is contained in the non-aqueous solvent at a ratio of less than 0.5 part by mass per 100 parts by mass of the non-aqueous solvent, the effect of preventing overcharge is insufficient. If the cycloalkylbenzene derivative is contained at a ratio of more than 5 parts by mass, the resistance increases because of the film formed on the negative electrode surface. In view of this, it is preferable that the cycloalkylbenzene derivative be contained in the non-aqueous solvent at a ratio of 0.5 to 5 parts by mass per 100 parts by mass of the non-aqueous solvent.

If the alkylbenzene derivative having a quaternary carbon directly bonded to the benzene ring is contained in the non-aqueous solvent at a ratio of less than 0.5 part by mass per 100 parts by mass of the non-aqueous solvent, the film adsorbed and formed on the negative electrode surface becomes coarse, failing to obtain sufficient high-temperature cycle characteristics. If the alkylbenzene derivative having a quaternary carbon directly bonded to the benzene ring is contained at a ratio of more than 10 parts by mass, the film adsorbed and formed on the negative electrode surface becomes dense, thereby excessively increasing electrical resistance. In view of this, it is preferable that this compound be contained in the non-aqueous solvent at a ratio of 0.5 to 10 parts by mass per 100 parts by mass of the non-aqueous solvent.

If the unsaturated cyclic carbonate derivative is contained in the non-aqueous solvent at a ratio of less than 0.5 part by mass per 100 parts by mass of the non-aqueous solvent, the film adsorbed and formed on the negative electrode surface becomes coarse, failing to obtain sufficient high-temperature cycle characteristics. If the unsaturated cyclic carbonate derivative is contained at a ratio of more than 10 parts by mass, the film adsorbed and formed on the negative electrode surface becomes dense, thereby excessively increasing electrical resistance. In view of this, it is preferable that the unsaturated cyclic carbonate derivative be contained in the non-aqueous solvent at a ratio of 0.5 to 10 parts by mass per 100 parts by mass of the non-aqueous solvent.

While the cycloalkylbenzene derivative is not to be particularly specified, for instance, cyclopentylbenzene and cyclohexylbenzene can be conveniently used.

While the alkylbenzene derivative having a quaternary carbon directly bonded to the benzene ring is not to be particularly specified, for instance, tert-butylbenzene, tert-amylbenzene, and tert-hexylbenzene can be conveniently used.

While the unsaturated cyclic carbonate derivative is not to be particularly specified, for instance, a compound having the structure shown as Chemical Formula 1 below can be conveniently used.

[Chemical Formula]

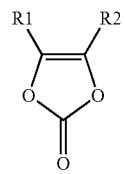

where R1 and R2 are independently a hydrogen atom or an alkyl group with six carbon atoms or less.

Figure 1:
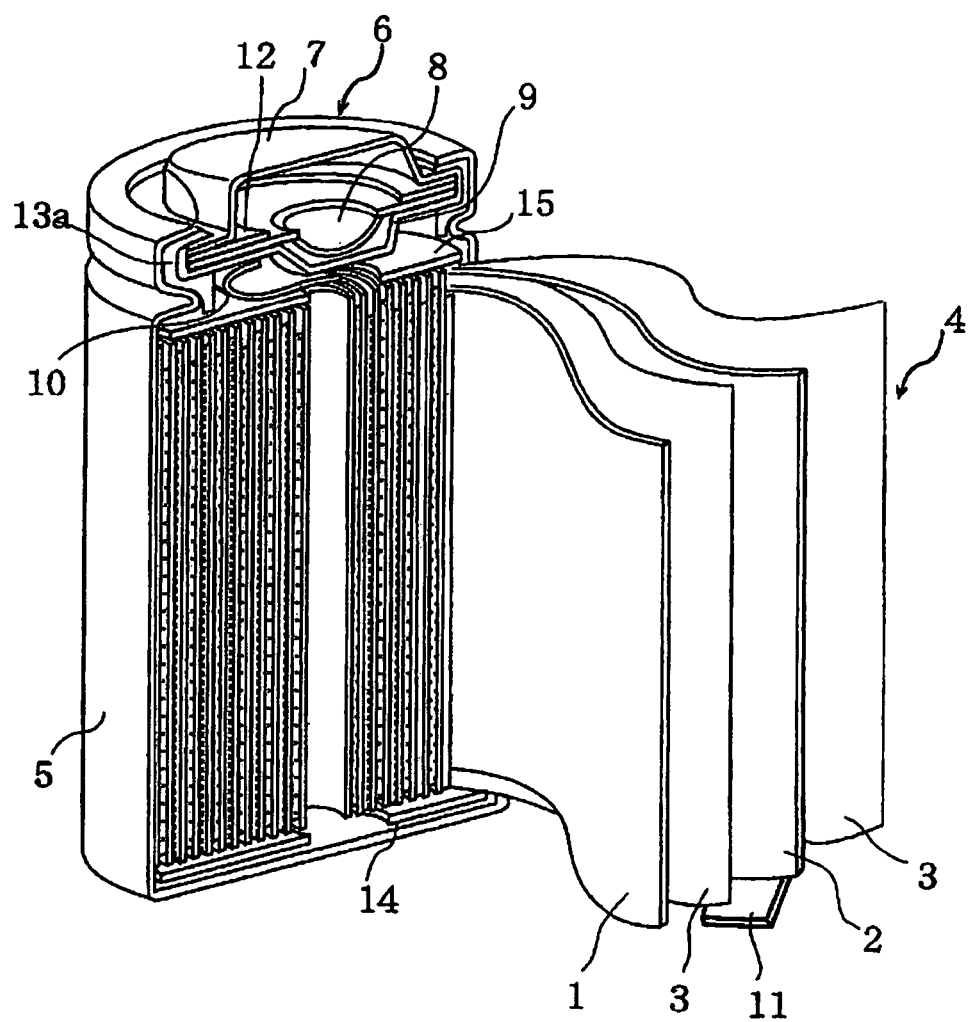
FIG. 1 is an exploded perspective view of a non-aqueous electrolyte secondary cell according to the present invention.

In the figures, reference numeral 1 refers to a positive electrode, reference numeral 2 to a negative electrode, 3 to a separator, 4 to an electrode assembly, 5 to an outer casing can, 6 to a sealing structure, 7 to a terminal cap, 8 to an explosion-proof valve, 9 to a sealing plate, 10 to a positive current collector tab, 11 to a negative current collector tab, 12 to a PCT element, 13 to a gasket, 13a to an outer gasket, 13b to an inner gasket, 14 and 15 to insulation plates, 16 to a caulking margin, 17 and 18 to gas releasing holes, 19 to inner portion of the sealing structure, and 20 to a cell body portion.

BEST MODE FOR CARRYING OUT THE INVENTION

An embodiment of the present invention will be described with reference to the drawings. It should be noted that the present invention is not limited to the following embodiment; it will be appreciated that variations are possible without departing from the scope of the invention.

Figure 2:
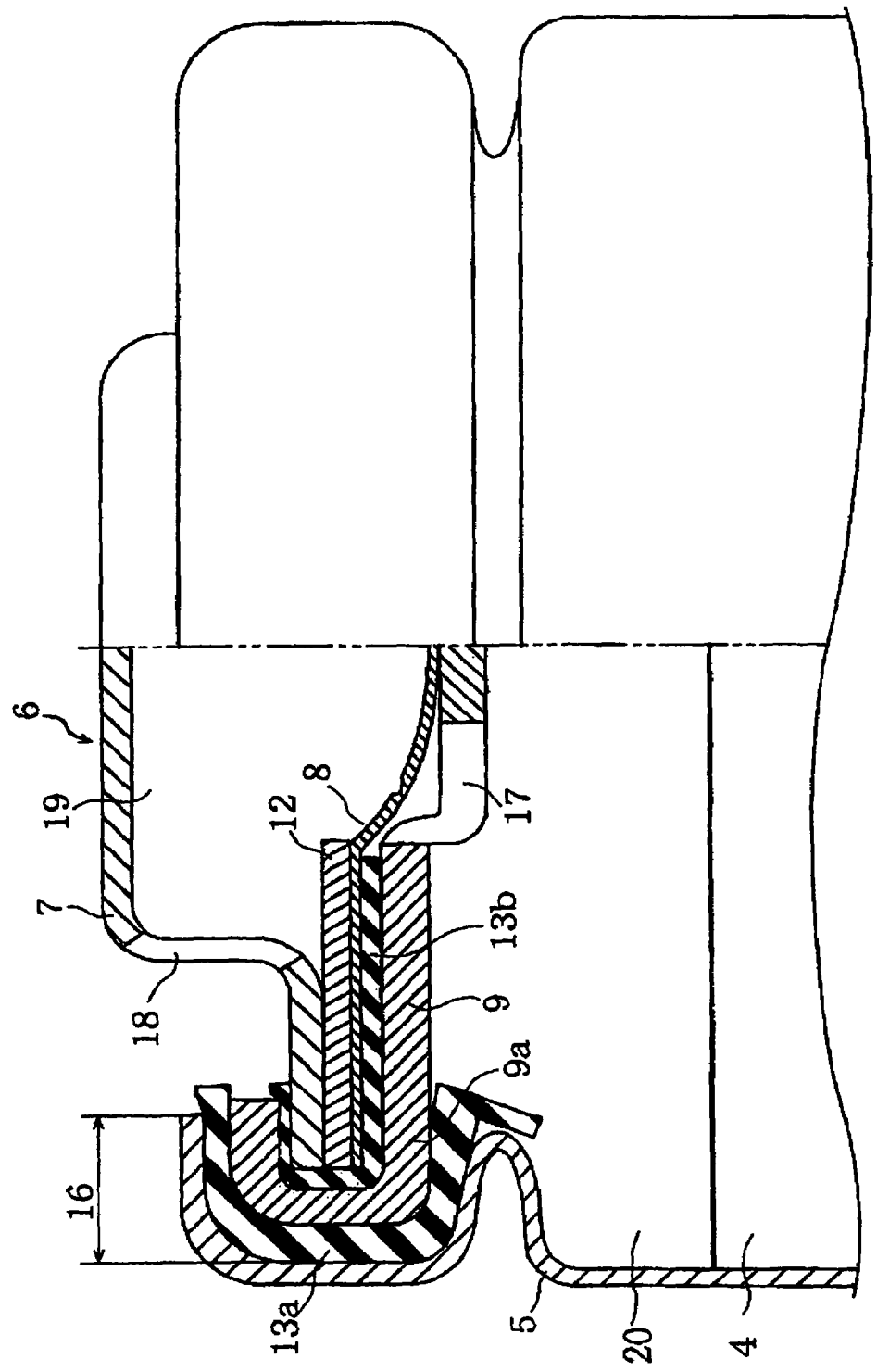
FIG. 2 is an enlarged half-sectional view of a sealing structure of the non-aqueous electrolyte secondary cell according to the present invention.

FIG. 1 is an exploded perspective view of a non-aqueous electrolyte secondary cell according to the embodiment of the present invention. FIG. 2 is an enlarged half-sectional view of a current-cutting sealing structure provided at the opening portion of the outer casing can shown in FIG. 1.

Referring to FIG. 1, a lithium ion cell according to an example of the present invention has a cylindrical outer casing can 5 provided with a bottom. In the outer casing can 5 is encased a spiral-shaped electrode assembly 4 formed of a positive electrode 1 in which an active material layer mainly made of $LiCoO_2$ is formed on a substrate made of aluminum, a negative electrode 2 in which an active material layer mainly made of graphite is formed on a substrate made of copper, and a separator 3 that separates the electrodes 1 and 2. Further in the outer casing can 5 is injected an electrolytic solution in which $LiPF_6$ is dissolved at a ratio of 1M (mole/liter) in a mixture solvent in which ethylene carbonate (EC) and diethyl carbonate (DEC) are mixed at a mass ratio of 4:6. To the opening portion of the outer casing can 5, a sealing structure 6 is caulked and fixed with the intervention of an insulating outer gasket 13a made of polypropylene (PP). Thus, the cell is sealed with the sealing structure 6.

The sealing structure 6, as shown in FIG. 2, has a sealing plate 9 made of an aluminum alloy. To the sealing plate 9, an explosion-proof valve 8 that has an approximately hemisphere center portion and is made of an aluminum alloy, a PTC element 12, and a terminal cap 7 provided with a gas releasing hole 18 are caulked and fixed with the intervention of an insulating inner gasket 13b made of polypropylene (PP). The explosion-proof valve 8 delimits an inner portion 19 of the sealing structure and a cell body portion 20 (the portion in which the electrode assembly 4 is encased). In a normal state, the explosion-proof valve 8 is electrically connected to the sealing plate 9. When abnormality such as overcharge occurs and internal cell pressure exceeds a predetermined value, the valve 8 is separated from the sealing plate 9 because of the internal cell pressure, thereby discontinuing the charge.

To the outer casing can 5 is connected a negative current collector tab 11 electrically connected to the negative electrode 2, and to the sealing plate 9 of the sealing structure 6 is connected a positive current collector tab 10. Thus, chemical energy generated inside the cell is turned into electric energy that is brought outside. Near both top and bottom end portions of the electrode assembly 4 are disposed insulation plates 14 and 15 for preventing short circuiting inside the cell.

In the above electrolyte solution are added a cycloalkylbenzene derivative and an alkylbenzene derivative having a quaternary carbon directly bonded to the benzene ring and not having a cycloalkyl group directly bonded to the benzene ring.

The negative electrode material used herein can be natural graphite, carbon black, coke, glass carbon, carbon fiber, or a carbonaceous substance such as a baked body of the foregoing, or a mixture of the carbonaceous substance and one or more substances selected from the group consisting of lithium, a lithium alloy, and a metal oxide capable of reversibly intercalating-deintercalating lithium.

The positive electrode material used herein can be one of lithium-containing transition metal compound oxides, or a mixture of two or more of the foregoing. Examples include lithium cobalt oxide, lithium nickel oxide, lithium manganese oxide, lithium metal oxide, or an oxide in which a part of the transition metal contained in the above oxides is substituted by another element.

The non-aqueous solvent used for the electrolytic solution can be a mixture of a high-permittivity solvent in which a lithium salt is highly soluble and a low-viscose solvent. Examples of the high-permittivity solvent include ethylene carbonate, propylene carbonate, butylene carbonate, and γ-butyrolactone. Examples of the low-viscose solvent include diethyl carbonate, dimethyl carbonate, ethyl methyl carbonate, 1,2-dimethoxy ethane, tetrahydrofuran, anisole, 1,4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate. The high-permittivity solvent and the low-viscose solvent each may be a mixture solvent of two or more of the foregoing.

The electrolyte salt used herein can be one compound or a mixture of two or more compounds selected from the group consisting of $LiN(C_2F_5SO_2)_2$, $LiN(CF_3SO_2)_2$, $LiClO_4$, $LiPF_6$, and $LiBF_4$. The amount of these electrolyte salts dissolved in the non-aqueous solvent is preferably 0.5 to 2.0 mole/liter.

The material of the sealing plate 9 is not limited to the above aluminum alloy; it is also possible to use metal aluminum, iron, stainless steel, or the like.

The present invention will be further detailed with the use of Examples.

EXAMPLE 1

A non-aqueous electrolyte secondary cell according to Example 1 was prepared in the following manner.

Ninety two parts by mass of a positive electrode active material made of lithium cobalt oxide ($LiCoO_2$), 5 parts by mass of a carbon-based conductivity agent made of acetylene black, 3 parts by mass of a binder made of polyvinylidene fluoride (PVdF), and N-methyl-2-pyrrolidone (NMP) were mixed, thus obtaining an active material slurry.

This active material slurry was uniformly applied on both surfaces of a positive electrode substrate made of an aluminum foil of 20 μm thick by doctor blade, and this resulting article was dried while passed through a heated dryer. By this drying step, an organic solvent required in the step of preparing the slurry was removed. Subsequently, this electrode plate was rolled with a roll press machine so that the thickness of the electrode plate was made to 0.17 mm, and thus, the positive electrode 1 was prepared.

Ninety five parts by mass of a negative electrode material made of graphite, 5 parts by mass of a binder made of polyvinylidene fluoride (PVdF), and N-methyl-2-pyrrolidone (NMP) were mixed, thus obtaining an active material slurry. This material slurry was uniformly applied on both surfaces of a negative electrode substrate made of a copper foil of 20 μm thick by doctor blade, and this resulting article was dried while passed through a heated dryer. By this drying step, an organic solvent required in the step of preparing the slurry was removed. Subsequently, this electrode plate was rolled with a roll press machine so that the thickness of the electrode plate was made to 0.14 mm, and thus, the negative electrode 2 was prepared.

Forty parts by mass of ethylene carbonate (EC) and 60 parts by mass of diethyl carbonate (DEC) were mixed to prepare a mixture solvent, and $LiPF_6$ for serving as the electrolyte salt was dissolved in the mixture solvent at a concentration of 1M (mole/liter). In this mixture solvent were added 1 part by mass of cyclohexylbenzene (CHB) and 2 parts by mass of tert-amylbenzene (t-AB). Thus, the electrolytic solution was prepared.

Next, the electrode assembly 4 was prepared by winding the positive electrode 1 and the negative electrode 2 with the separator 3 (25 μm thick) made of a microporous film of polyethylene interposed therebetween. Then, the electrode assembly 4 was enclosed in the outer casing can 5 together with the insulation plate 14, and the negative current collector tab 11 was welded to the bottom of the outer casing can 5.

Then, the explosion-proof valve 8, the PTC element 12, and the terminal cap 7 were caulked and fixed to the sealing plate 9 with the intervention of the inner gasket 13b. Thus, the inner portion 20 of the sealing structure was sealed. Then, the positive current collector tab 10 was welded to the sealing plate 6, and the electrolytic solution prepared above was injected into the outer casing can 5. Then, the sealing plate 6 was caulked and fixed to the opening end portion of the outer casing can 5 with the intervention of the outer gasket 13a. Thus, a cell A1 of the present invention according to Example 1 was prepared. The nominal capacity of the cell thus prepared was 1500 mAh.

EXAMPLE 2

A cell A2 of the present invention according to Example 2 was prepared in the same manner as Example 1 except that 0.5 part by mass of the cyclohexylbenzene was added.

EXAMPLE 3

A cell A3 of the present invention according to Example 3 was prepared in the same manner as Example 1 except that 5 parts by mass of the cyclohexylbenzene was added.

EXAMPLE 4

A cell A4 of the present invention according to Example 4 was prepared in the same manner as Example 1 except that 6 parts by mass of the cyclohexylbenzene was added.

EXAMPLE 5

A cell A5 of the present invention according to Example 5 was prepared in the same manner as Example 1 except that 0.5 part by mass of the tert-amylbenzene was added.

EXAMPLE 6

A cell A6 of the present invention according to Example 6 was prepared in the same manner as Example 1 except that 10 parts by mass of the tert-amylbenzene was added.

EXAMPLE 7

A cell A7 of the present invention according to Example 7 was prepared in the same manner as Example 1 except that 12 parts by mass of the tert-amylbenzene was added.

EXAMPLE 8

A cell A8 of the present invention according to Example 8 was prepared in the same manner as Example 1 except that vinylene carbonate (VC) was added.

EXAMPLE 9

A cell A9 of the present invention according to Example 9 was prepared in the same manner as Example 8 except that 0.5 part by mass of the cyclohexylbenzene was added.

EXAMPLE 10

A cell A10 of the present invention according to Example 10 was prepared in the same manner as Example 8 except that 5 parts by mass of the cyclohexylbenzene was added.

EXAMPLE 11

A cell A11 of the present invention according to Example 11 was prepared in the same manner as Example 8 except that 6 parts by mass of the cyclohexylbenzene was added.

EXAMPLE 12

A cell A12 of the present invention according to Example 12 was prepared in the same manner as Example 8 except that 0.5 part by mass of the tert-amylbenzene was added.

EXAMPLE 13

A cell A13 of the present invention according to Example 13 was prepared in the same manner as Example 8 except that 10 parts by mass of the tert-amylbenzene was added.

EXAMPLE 14

A cell A14 of the present invention according to Example 14 was prepared in the same manner as Example 8 except that 11 parts by mass of the tert-amylbenzene was added.

COMPARATIVE EXAMPLE 1

A comparison cell X1 according to Comparative Example 1 was prepared in the same manner as Example 1 except that no additives were added.

COMPARATIVE EXAMPLE 2

A comparison cell X2 according to Comparative Example 2 was prepared in the same manner as Example 1 except that the tert-amylbenzene was not added.

COMPARATIVE EXAMPLE 3

A comparison cell X3 according to Comparative Example 3 was prepared in the same manner as Example 1 except that the tert-amylbenzene was not added and 2 parts by mass of the cyclohexylbenzene was added.

COMPARATIVE EXAMPLE 4

A comparison cell X4 according to Comparative Example 4 was prepared in the same manner as Example 1 except that the cyclohexylbenzene was not added.

COMPARATIVE EXAMPLE 5

A comparison cell X5 according to Comparative Example 5 was prepared in the same manner as Example 1 except that the cyclohexylbenzene was not added and 5 parts by mass of the tert-amylbenzene was added.

COMPARATIVE EXAMPLE 6

A comparison cell X6 according to Comparative Example 6 was prepared in the same manner as Example 1 except that the cyclohexylbenzene and tert-amylbenzene were not added and 2 parts by mass of cumene was added.

COMPARATIVE EXAMPLE 7

A comparison cell X7 according to Comparative Example 7 was prepared in the same manner as Example 1 except that the cyclohexylbenzene and tert-amylbenzene were not added and 2 parts by mass of trimellitic ester was added.

COMPARATIVE EXAMPLE 8

A comparison cell X8 according to Comparative Example 8 was prepared in the same manner as Example 1 except that the cyclohexylbenzene and tert-amylbenzene were not added and 1 part by mass of vinylene carbonate was added.

<Cell Characteristics Tests>

With respect to the cells A1 to A14 of the present invention and to the comparison cells X1 to X8, overcharge tests and high temperature cycle tests were conducted under the following conditions.

<Overcharge Tests>

Each cell was charged under the conditions of 1C (1500 mA) and 4.2V for three hours and then overcharged with a charge current of 2C (3000 mA). The time between the starting of overcharge and the operation of the current-cutting sealing structure was measured, and the temperature outside the cell was measured.

<High Temperature Cycle Tests>

Charge conditions: constant current, 1 C(1500 mA); constant voltage, 4.2 V; discharge-ending current, 30 mA; and temperature, 60° C.

Discharge conditions: constant current, 1 C(1500 mA); discharge-ending voltage, 2.75 V; and temperature, 60° C.

High temperature cycle characteristics capacity maintenance rate (%): (300-cycle discharge capacity/1-cycle discharge capacity)×100

Table 1 below lists the additives added, the amounts thereof, the time between the starting of overcharge and the operation of the current-cutting sealing structure, the highest temperature outside the cell, and the results of the high temperature cycle tests.

TABLE 1

| Cell | Additives | Current cutting time (min) | Highest temperature (° C.) | High temperature cycle characteristics (%) |
|---|---|---|---|---|
| A1 | 1% CHB, 2% t-AB | 15 | 74 | 60 |
| A2 | 0.5% CHB, 2% t-AB | 19 | 81 | 63 |
| A3 | 5% CHB, 2% t-AB | 12 | 70 | 58 |
| A4 | 6% CHB, 2% t-AB | 12 | 73 | 50 |
| A5 | 1% CHB, 0.5% t-AB | 13 | 75 | 60 |
| A6 | 1% CHB, 10% t-AB | 14 | 71 | 61 |
| A7 | 1% CHB, 12% t-AB | 12 | 72 | 53 |
| A8 | 1% CHB, 2% t-AB, 1% VC | 14 | 73 | 82 |
| A9 | 0.5% CHB, 2% t-AB, 1% VC | 18 | 82 | 84 |
| A10 | 5% CHB, 2% t-AB, 1% VC | 13 | 72 | 80 |
| A11 | 6% CHB, 2% t-AB, 1% VC | 12 | 72 | 70 |
| A12 | 1% CHB, 0.5% t-AB, 1% VC | 14 | 75 | 82 |
| A13 | 1% CHB, 10% t-AB, 1% VC | 13 | 72 | 81 |
| A14 | 1% CHB, 11% t-AB, 1% VC | 13 | 72 | 72 |
| X1 | No Additives | 35 | Abnormality | 62 |
| X2 | 1% CHB | 27 | Abnormality | 54 |
| X3 | 2% CHB | 14 | 73 | 45 |
| X4 | 2% t-AB | 35 | Abnormality | 61 |
| X5 | 5% t-AB | 35 | Abnormality | 60 |
| X6 | 2% cumene | 18 | 83 | 36 |
| X7 | 2% trimellitic ester | 20 | 85 | 21 |
| X8 | 1% VC | 36 | Abnormality | 77 |

CHB: cyclohexylbenzene (cycloalkylbenzene derivative)
t-AB: tert-amylbenzene (alkylbenzene derivative having a quaternary carbon directly bonded to the benzene ring)
VC: vinylene carbonate (unsaturated cyclic carbonate)

Where the cell temperature arose and smoking occurred, such a case is indicated as abnormality in Table 1.

Table 1 shows that the inventive cells A1 to A14, in which the cycloalkylbenzene derivative (CHB) and the alkylbenzene derivative having a quaternary carbon directly bonded to the benzene ring (t-AB) are added, realize high temperature cycle characteristics of 50% or higher and the effect of preventing overcharge (a current cutting time of 19 minutes or less and a highest temperature of 82° C. or lower).

This can be explained as follows. In the cycloalkylbenzene derivative, a hydrogen atom bonded to α carbon (a carbon directly bonded to the benzene ring) in the cycloalkyl group has high reactivity, and as such this hydrogen is easy to be pulled out at the time of overcharge. Thus, at the time of overcharge the cycloalkylbenzene derivative is rapidly decomposed at the negative electrode to generate a hydrogen gas, and the cycloalkylbenzene derivative itself polymerizes to form a stable film on the negative electrode surface. This film has high electrical resistance and thus restricts overcharge. In a cell provided with a current-cutting device, the hydrogen gas generated by the decomposition of the cycloalkylbenzene derivative increases internal cell pressure, thereby increasing the reactivity of the current-cutting device. Further, the alkylbenzene derivative having a quaternary carbon directly bonded to the benzene ring is adsorbed on the negative electrode surface to form a film so that the cycloalkylbenzene derivative would not come in direct contact with the negative electrode. This restricts the decomposition of the cycloalkylbenzene derivative under a high temperature, thereby preventing the deterioration of high temperature cycle characteristics. As a result, good cycle characteristics and the effect of preventing overcharge are obtained.

The cell A8, in which the unsaturated cyclic carbonate (VC) is added, is superior in high temperature cycle characteristics to the cell A1 without VC added therein. This is because the unsaturated cyclic carbonate has an adsorption portion different from that of the alkylbenzene derivative having a quaternary carbon directly bonded to the benzene ring (the alkylbenzene derivative having a quaternary carbon directly bonded to the benzene ring being mainly adsorbed on the basal surface of the carbon, and the unsaturated cyclic carbonate being mainly adsorbed on the edge surface of the carbon). This causes the film to be formed more efficiently, thereby preventing the cycloalkylbenzene derivative from making contact with the negative electrode and from being decomposed.

The cell X1, in which no additives were added, the cells X4 and X5, in which only the alkylbenzene derivative having a quaternary carbon directly bonded to the benzene ring was added, and the cell X8, in which only the unsaturated cyclic carbonate was added, had abnormality such as smoking. This is presumably because sufficient prevention of overcharge is impossible without additives, and because the alkylbenzene derivative having a quaternary carbon directly bonded to the benzene ring and the unsaturated cyclic carbonate have virtually no effectiveness in preventing overcharge.

The cells X2 and X3, in which only the cycloalkylbenzene derivative was added, the cell X6, in which only the cumene (alkylbenzene derivative having a tertiary carbon directly bonded to the benzene ring) was added, and the cell X7, in which only the trimellitic ester (benzene derivative in which the quaternary carbon directly bonded to the benzene ring is a carboxyl carbon) was added, had high-temperature cycle characteristics of 54%, which is lower than 62% for the cell X1 without additives added therein. This is presumably because the cycloalkylbenzene derivative, the alkylbenzene derivative having a tertiary carbon directly bonded to the benzene ring, and the benzene derivative in which the quaternary carbon directly bonded to the benzene ring is a carboxyl carbon are decomposed under a high temperature to form a highly resistive film on the negative electrode.

The results of the cells A1 to A4 and A8 to A11 show that when the cycloalkylbenzene derivative is contained in the non-aqueous solvent at a ratio of 0.5 to 5 parts by mass per 100 parts by mass of the non-aqueous solvent excellent cell characteristics are obtained; specifically, the high temperature cycle characteristics is 58% or higher in the cells without the unsaturated cyclic carbonate added therein and the high temperature cycle characteristics is 80% or higher in the cells with the unsaturated cyclic carbonate added therein. Thus, the amount of the cycloalkylbenzene derivative added is preferably controlled within the above-described range.

The results of the cells A1, A5 to A8, and A12 to A14 show that when the alkylbenzene derivative having a quaternary carbon directly bonded to the benzene ring is contained in the non-aqueous solvent at a ratio of 0.5 to 10 parts by mass per 100 parts by mass of the non-aqueous solvent excellent cell characteristics are obtained; specifically, the high temperature cycle characteristics is 58% or higher in the cells without the unsaturated cyclic carbonate added therein and the high temperature cycle characteristics is 80% or higher in the cells with the unsaturated cyclic carbonate added therein. Thus, the added amount of the alkylbenzene derivative having a quaternary carbon directly bonded to the benzene ring is preferably controlled within the above-described range.

While in the above Examples cylindrical cells were prepared, the present invention is not limited to such a shape; the invention can also be applied to cells of various shapes such as coin-shaped cells, square-shaped cells, and laminate cells. It is also possible to apply the present invention to gel non-aqueous electrolyte secondary cells using a polymer electrolyte.

While in the above Examples cells having the current-cutting device were prepared, the present invention can also be applied to cells not provided with the current-cutting device. In this case, the cycloalkylbenzene derivative is decomposed at the time of overcharge to form a highly resistive film and generates a hydrogen gas to increase internal resistance, thereby preventing overcharge.

While in the above Examples cells using cyclohexylbenzene as the cycloalkylbenzene derivative and using tert-amylbenzene as the alkylbenzene derivative having a quaternary carbon directly bonded to the benzene ring were used, the present invention is not limited to the above compounds. For instance, a cell using cyclopentylbenzene as the cycloalkylbenzene derivative and using tert-butylbenzene as the alkylbenzene derivative having a quaternary carbon directly bonded to the benzene ring can also realize good high temperature cycle characteristics and safety such that no abnormality occurs at the time of overcharge. Further, while vinylene carbonate was used as the unsaturated cyclic carbonate, the present invention is not limited to this compound. For instance, a cell using methyl vinylene carbonate or the like also can realize good high temperature cycle characteristics and safety such that no abnormality occurs at the time of overcharge.

INDUSTRIAL APPLICABILITY

As has been described above, the non-aqueous electrolyte secondary cell according to the present invention is excellent in high temperature cycle characteristics and in safety such that no abnormality occurs at the time of overcharge. Thus, the industrial applicability of the present invention is considerable.

What is claimed is:

1. A non-aqueous electrolyte secondary cell comprising:
   a positive electrode for reversibly intercalating-deintercalating lithium ions;
   a negative electrode for reversibly intercalating-deintercalating lithium ions; and
   a non-aqueous electrolyte having a non-aqueous solvent and an electrolyte salt, wherein,
   the non-aqueous solvent includes a cycloalkylbenzene derivative, tert-amylbenzene, and an unsaturated cyclic carbonate derivative.

2. The non-aqueous electrolyte secondary cell according to claim 1, wherein the unsaturated cyclic carbonate derivative is vinylene carbonate contained in the non-aqueous solvent at a ratio of 0.5 to 10 parts by mass per 100 parts by mass of the non-aqueous solvent.

3. The non-aqueous electrolyte secondary cell according to claim 1, wherein: the cycloalkylbenzene derivative is contained in the non-aqueous solvent at a ratio of 0.5 to 5 parts by mass per 100 parts by mass of the non-aqueous solvent; and
   the tert-amylbenzene is contained in the non-aqueous solvent at a ratio of 0.5 to 10 parts by mass per 100 parts by mass of the non-aqueous solvent.

4. The non-aqueous electrolyte secondary cell according to claim 2, wherein:
   the cycloalkylbenzene derivative is contained in the non-aqueous solvent at a ratio of 0.5 to 5 parts by mass per 100 parts by mass of the non-aqueous solvent; and
   the tert-amylbenzene is contained in the non-aqueous solvent at a ratio of 0.5 to 10 parts by mass per 100 parts by mass of the non-aqueous solvent.

* * * * *